US009282475B2

(12) United States Patent
Cheng (10) Patent No.: US 9,282,475 B2
(45) Date of Patent: Mar. 8, 2016

(54) METHOD AND SYSTEM FOR CALCULATING TOTAL RECEIVED POWER OF HIGH SPEED PHYSICAL DOWNLINK SHARED CHANNEL

(75) Inventor: Xiang Cheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 317 days.

(21) Appl. No.: 13/883,047

(22) PCT Filed: Sep. 23, 2011

(86) PCT No.: PCT/CN2011/080084
§ 371 (c)(1),
(2), (4) Date: May 2, 2013

(87) PCT Pub. No.: WO2012/058991
PCT Pub. Date: May 10, 2012

(65) Prior Publication Data
US 2013/0223270 A1      Aug. 29, 2013

(30) Foreign Application Priority Data

Nov. 5, 2010   (CN) .......................... 2010 1 0533216

(51) Int. Cl.
*H04W 24/04*     (2009.01)
*H04W 36/00*     (2009.01)
(Continued)

(52) U.S. Cl.
CPC .......... *H04W 24/04* (2013.01); *H04W 36/0072* (2013.01); *H04W 24/10* (2013.01); *H04W 36/10* (2013.01)

(58) Field of Classification Search
CPC ......................... H04W 24/00; H04W 36/0077
USPC .......................................................... 370/252
See application file for complete search history.

(56) References Cited

U.S. PATENT DOCUMENTS 7,209,456 B2 *  4/2007  Kwak et al. ................... 370/318
2005/0215255 A1  9/2005  Tanoue
(Continued)

FOREIGN PATENT DOCUMENTS

| CN | 101341666 A | 1/2009 |
|---|---|---|
| CN | 101351010 A | 1/2009 |

(Continued)

OTHER PUBLICATIONS

International Search Report for PCT/CN2011/080084 dated Dec. 16, 2011.

*Primary Examiner* — Ian N Moore
*Assistant Examiner* — Mewale Ambaye
(74) *Attorney, Agent, or Firm* — Ling Wu; Stephen Yang; Ling and Yang Intellectual Property (57) ABSTRACT

A method for calculating total received power of an HS-PDSCH is disclosed in the patent document, comprising: when a terminal performs an HS-DSCH cell handover across an IUR interface, an SRNC requesting a DRNC to establish an HS-DSCH pre-configuration; the DRNC returning information of a measured power deviation of a target serving cell to the SRNC; the SRNC sending said information to the terminal; and after performing the handover to the target serving cell, the terminal using the measured power deviation of the target serving cell to estimate the total received power of the HS-PDSCH in the target serving cell. A system for calculating the total received power of the HS-PDSCH is also disclosed in the patent document, and the system comprises: a first module and second module of a serving radio network controller, a drift radio network controller and a terminal.

7 Claims, 3 Drawing Sheets

(51) Int. Cl.
*H04W 24/10* (2009.01)
*H04W 36/10* (2009.01)

(56) References Cited

U.S. PATENT DOCUMENTS

| | | | |
|---|---|---|---|
| 2007/0099664 A1* | 5/2007 | Hwang | 455/560 |
| 2008/0020739 A1* | 1/2008 | Godin et al. | 455/414.1 |
| 2008/0049683 A1* | 2/2008 | Nakamata et al. | 370/335 |

FOREIGN PATENT DOCUMENTS

| | | |
|---|---|---|
| CN | 101553999 A | 10/2009 |
| CN | 101601218 A | 12/2009 |
| CN | 101621828 A | 1/2010 |
| EP | 1313231 A1 | 5/2003 |
| EP | 1341318 A2 | 9/2003 |
| WO | 2008095115 A2 | 8/2008 |
| WO | 2011123711 A1 | 10/2011 |

* cited by examiner

FIG. 5

METHOD AND SYSTEM FOR CALCULATING TOTAL RECEIVED POWER OF HIGH SPEED PHYSICAL DOWNLINK SHARED CHANNEL

TECHNICAL FIELD

The patent document relates to the wireless communication system, and specifically, to a method and system for calculating total received power of a high speed physical downlink shared channel using the high speed downlink packet access technology in the third generation wireless communication system.

BACKGROUND OF THE RELATED ART

The high speed downlink packet access technology introduces a new transmission channel namely a High Speed Downlink Shared Channel (HS-DSCH), which is used for bearing the actual user data accessed by the high speed downlink packet. The high speed packet access technology introduces new physical channels. A High Speed Shared Control Channel (HS-SCCH) is one of the newly added physical channels and is used for bearing certain important control signaling information. The working process of HS-DSCH is always accompanied by the HS-SCCH.

In the high speed downlink packet access technology, in all cells in a soft handover active set, there is only one serving HS-DSCH cell. Characteristics of the serving HS-DSCH cell lie in that the HS-DSCH and HS-SCCH will be only transmitted in this cell, and corresponding uplink feedback will be received. In the multi-carrier high speed packet access technology, each layer of carriers will has its own independent soft handover active set. The serving HS-DSCH cell in a primary carrier soft handover active set is called as a primary carrier serving HS-DSCH cell or a primary serving HS-DSCH cell. The serving HS-DSCH cell in an auxiliary carrier soft handover active set is called as an auxiliary carrier serving HS-DSCH cell or an auxiliary serving HS-DSCH cell.

In the high speed downlink packet access technology, the adaptive coding and modulation technology is adopted to replace the traditional dedicated channel power control technology. A fundamental principle of the adaptive coding and modulation technology is to match a modulation and coding scheme of the system with an average channel condition in the process of each terminal transmitting data. Signal power of the data transmission keeps unchanged within a subframe period, but modulation and coding formats are changed in order to match the current signal quality or channel condition. The change of data transmission rate is implemented by changing the modulation and coding formats of the physical channels. A terminal reports a channel quality indication to a node B according to a situation of the current downlink channel (i.e. a High Speed Physical Downlink Shared Channel (HS-PDSCH)), and the node B can match a coding rate and modulation mode of a downlink channel with the optimal performance according to this channel quality indication.

A reporting rule of the channel quality indication is: within an unlimited observation time, the terminal reporting a maximum channel quality indication value to the node B. In order to obtain a correct channel quality indication value, the terminal needs to estimate total received power of the high speed physical downlink shared channel, and according to the total received power of the high speed physical downlink shared channel and a curve of channel quality indication values, the terminal obtains a corresponding channel quality indication value.

The total received power of the high speed physical downlink shared channel is estimated using the following formula: total received power of high speed physical downlink shared channel=total received power of common pilot channel combination+measured power deviation+reference power adjustment amount. Wherein: the total received power of common pilot channel combination is measured by the terminal; the reference power adjustment amount depends on a grade classification of the terminal and the channel situation reported at that time, and its value is generally 0; the measured power deviation is defined as a measured power deviation of transmitted power of high speed physical downlink shared channel relative to the total received power of common pilot channel combination, and thus a Controlling Radio Network Controller (CRNC), to which a cell belongs, possesses radio resources of this cell. The measured power deviation in the formula is configured by the CRNC, to which the cell belongs, for the terminal.

Figure 1:
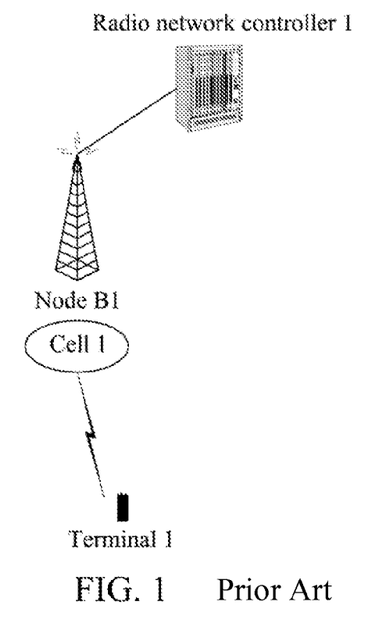
FIG. 1 is a schematic diagram of a non-across IUR interface scenario.

As shown in FIG. 1, the controlling radio network controller of a cell 1 is a radio network controller 1, and when a terminal 1 uses the high speed downlink packet access technology in the cell 1, the cell 1 is a serving HS-DSCH cell of the terminal 1. The radio network controller 1 will configure a measured power deviation of the cell 1 to the terminal 1. The terminal 1 measures total received power of the common pilot channel combination of the cell 1, and determines the reference power adjustment amount according to the grade classification of the terminal 1 and the channel situation reported at that time. Then, the terminal uses the above formula to estimate the total received power of the high speed physical downlink shared channel of the cell 1.

An Interconnection of Radio Network Controller (IUR) interface is an interface used for performing singling and data interaction with other radio network controllers by a radio network controller, and it is an interconnected tie among radio network subsystems.

When a terminal establishes a connection to a wireless access network and a soft handover occurs at the IUR interface, resources of more than one radio network controller will be used, and different radio network controllers play different roles at this point as follows:

A Serving Radio Network Controller (SRNC): a radio network controller keeping the terminal connected with interfaces of a core network is the serving radio network controller, and the serving radio network controller is responsible for data transmission between the core network and the terminal and for forwarding and receiving interface signalings between the serving radio network controller and the core network, it is responsible for performing the radio resource control, and it is responsible for performing layer 2 processing on data of air interfaces, and executing basic operations of radio resource management, such as handover decision, outer loop power control, and conversion from parameters borne by wireless access to air interface transmission channel parameters and so on;

A Drift Radio Network Controller (DRNC): the drift radio network controller is another radio network controller except the serving radio network controller, and the drift radio network controller controls cells used by the terminal, and if necessary, the drift radio network controller can perform macro diversity combining Unless the terminal uses a common transmission channel, the drift radio network controller will not perform layer 2 processing on user plane data of the terminal, but it just transparently transfers air interface data to the serving radio network controller through routing of the IUR interface. The number of drift radio network controllers of one terminal can be more than one.

Figure 2:
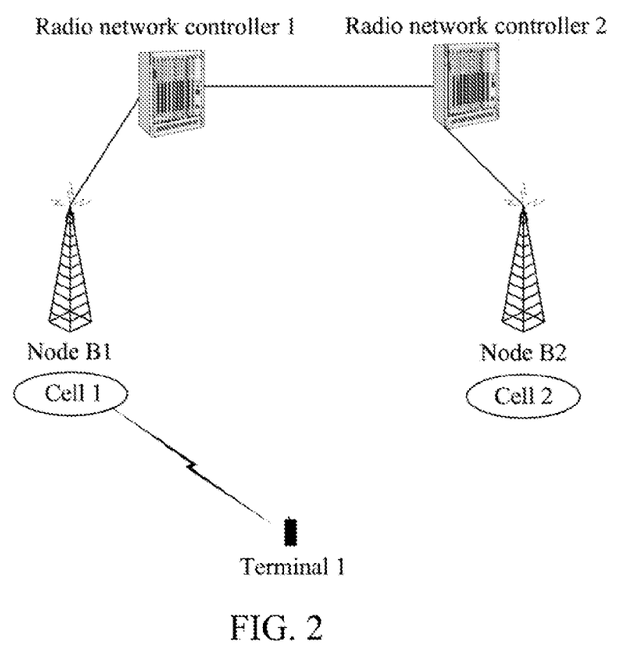
FIG. 2 is a schematic diagram of a single-carrier scenario according to the example 1 of the patent document.

In engineering applications, when encountering a scenario shown in FIG. 2, the controlling radio network controller of the cell 1 is the radio network controller 1, the controlling radio network controller of a cell 2 is a radio network controller 2. The IUR interface exists between the radio network controller 1 and the radio network controller 2. The terminal 1 moves from the cell 1 to the cell 2, the radio network controller 1 is the serving radio network controller of the terminal 1, and the radio network controller 2 is the drift radio network controller of the terminal 1. The terminal 1 moves from the cell 1 to the cell 2, the cell 1 is a current serving HS-DSCH cell of the terminal 1, and the cell 2 is a target serving HS-DSCH cell to which the terminal 1 will hand over from the current serving HS-DSCH cell, that is, the terminal 1 wants to perform a serving HS-DSCH cell handover, i.e. the terminal 1 wants to hand over from the serving HS-DSCH cell, namely the cell 1, to the cell 2. The problem of call drop in the terminal will occur.

SUMMARY OF THE INVENTION

The object of the patent document is to provide a method and system for calculating total received power of a high speed physical downlink shared channel, which avoids an occurrence of call drop in the terminal during a handover of a serving High Speed Downlink Shared Channel (HS-DSCH) cell.

In order to solve the above technical problem, the patent document provides a method for calculating total received power of a high speed physical downlink shared channel, which comprises:

when a terminal performs a serving High Speed Downlink Shared Channel (HS-DSCH) cell handover across an Interconnection of Radio Network Controller (IUR) interface, a serving radio network controller requesting a drift radio network controller to establish an HS-DSCH pre-configuration in a target serving HS-DSCH cell dominated by the drift radio network controller;

the drift radio network controller returning information of a measured power deviation of the target serving HS-DSCH cell which serves as HS-DSCH pre-configuration information to the serving radio network controller;

the serving radio network controller taking the information of the measured power deviation of the target serving HS-DSCH cell as pre-configuration information to send to the terminal; and after the terminal hands over a current serving HS-DSCH cell to the target serving HS-DSCH cell, the terminal using the measured power deviation of the target serving HS-DSCH cell to estimate the total received power of the high speed physical downlink shared channel in the target serving HS-DSCH cell.

The method is applied to a single-carrier environment; the target serving HS-DSCH cell comprises: a single-carrier target serving HS-DSCH cell.

The method is applied to a multi-carrier environment; the target serving HS-DSCH cell comprises: a primary carrier target serving HS-DSCH cell and an auxiliary carrier target serving HS-DSCH cell.

In order to solve the above technical problem, the patent document further provides an access network system, which comprises: a serving radio network controller and a drift radio network controller, wherein the serving radio network controller comprises a first module and a second module, wherein:

the first module of the serving radio network controller is configured to: when a terminal performs a serving High Speed Downlink Shared Channel (HS-DSCH) cell handover across an Interconnection of Radio Network Controller (IUR) interface, request the drift radio network controller to establish an HS-DSCH pre-configuration in a target serving HS-DSCH cell dominated by the drift radio network controller;

the drift radio network controller is configured to return information of a measured power deviation of the target serving HS-DSCH cell which serves as HS-DSCH pre-configuration information to the serving radio network controller; and the second module of the serving radio network controller is configured to take the information of the measured power deviation of the target serving HS-DSCH cell as pre-configuration information to send to the terminal.

The system is applied to a single-carrier environment; the target serving HS-DSCH cell comprises: a single-carrier target serving HS-DSCH cell.

The system is applied to a multi-carrier environment; the target serving HS-DSCH cell comprises: a primary carrier target serving HS-DSCH cell and an auxiliary carrier target serving HS-DSCH cell.

In order to solve the above technical problem, the patent document further provides a system for calculating total received power of a high speed physical downlink shared channel, which comprises: a serving radio network controller, a drift radio network controller and a terminal, wherein the serving radio network controller comprises a first module and a second module, wherein:

the first module of the serving radio network controller is configured to: when the terminal performs a serving High Speed Downlink Shared Channel (HS-DSCH) cell handover across an Interconnection of Radio Network Controller (IUR) interface, request the drift radio network controller to establish an HS-DSCH pre-configuration in a target serving HS-DSCH cell dominated by the drift radio network controller;

the drift radio network controller is configured to return information of a measured power deviation of the target serving HS-DSCH cell which serves as HS-DSCH pre-configuration information to the serving radio network controller;

the second module of the serving radio network controller is configured to take the information of the measured power deviation of the target serving HS-DSCH cell as pre-configuration information to send to the terminal; and the terminal is configured to: after handing over from a current serving HS-DSCH cell to the target serving HS-DSCH cell, use the measured power deviation of the target serving HS-DSCH cell to estimate the total received power of the high speed physical downlink shared channel in the target serving HS-DSCH cell.

The system is applied to a single-carrier environment; the target serving HS-DSCH cell comprises: a single-carrier target serving HS-DSCH cell.

The system is applied to a multi-carrier environment; the target serving HS-DSCH cell comprises: a primary carrier target serving HS-DSCH cell and an auxiliary carrier target serving HS-DSCH cell.

With the method and system of the example, when the terminal prepares to perform a serving HS-DSCH cell handover across an IUR interface, the serving radio network controller of the terminal can obtain the information of the measured power deviation of the target serving HS-DSCH cell, thereby configuring the correct information of the measured power deviation of the target serving HS-DSCH cell for the terminal. Therefore, the terminal can correctly estimate the total received power of the high speed physical downlink shared channel so as to obtain a correct channel quality indication value, thus guarantying an appropriate use of the high speed downlink packet access technology and ensuring the performance.

PREFERRED EMBODIMENTS OF THE PRESENT INVENTION

By analyzing the related art, it is discovered that only a radio network controller 2 knows a measured power deviation of a cell 2 (the radio network controller 2 is a controlling radio network controller of the cell 2), and a radio network controller 1 does not know the measured power deviation (the radio network controller 1 is not the controlling radio network controller of the cell 2), that is, the measured power deviation of a target serving HS-DSCH cell is known only by the controlling radio network controller of the cell. However, a terminal needs to know the measured power deviation of the cell 2 and thus is able to estimate total received power of a high speed physical downlink shared channel, and if the terminal does not know the measured power deviation of the cell 2, a correct channel quality indication value cannot be obtained. The terminal can only obtain information of the measured power deviation of the cell 2 from a serving radio network controller of the terminal, namely the radio network controller 1. However, the radio network controller 1 does not know the information of the measured power deviation of the cell 2, therefore it cannot configure the measured power deviation of the cell 2 for the terminal, thus the terminal misses this information, the total received power of the high speed physical downlink shared channel cannot be estimated, the correct channel quality indication value cannot obtained, and a node B cannot match a coding rate and modulation mode of a downlink channel with the optimal performance according to an incorrect channel quality indication, thereby leading to a call drop directly.

In order to solve the problem existing in the related art, a scheme is as follows:

when a terminal performs a serving HS-DSCH cell handover across an IUR interface, a serving radio network controller requesting a drift radio network controller to establish an HS-DSCH pre-configuration in a target serving HS-DSCH cell dominated by the drift radio network controller;

the drift radio network controller returning information of a measured power deviation of the target serving HS-DSCH cell serving as HS-DSCH pre-configuration information to the serving radio network controller;

the serving radio network controller taking the information of the measured power deviation of the target serving HS-DSCH cell as pre-configuration information to send to the terminal; and the terminal saving the information of the measured power deviation of the target serving HS-DSCH cell; and after the terminal hands over from a current serving HS-DSCH cell to the target serving HS-DSCH cell, the terminal using the saved measured power deviation of the target serving HS-DSCH cell to estimate the total received power of the high speed physical downlink shared channel in the target serving HS-DSCH cell.

When the above method is applied to a single-carrier environment, the target serving HS-DSCH cell includes: a single-carrier target serving HS-DSCH cell; and when the above method is applied to a multi-carrier environment, the target serving HS-DSCH cell includes: a primary carrier target serving HS-DSCH cell and an auxiliary carrier target serving HS-DSCH cell.

The execution of the technical scheme of the patent document will be further described in detail in combination with the accompanying drawings below. It should be noted that the examples in the patent document and the characteristics in the examples can be optionally combined with each other in the condition of no conflict.

EXAMPLE 1

A single-carrier setting scenario of the present example is a scenario shown in FIG. 2 (that is the scenario mentioned in the background of the related art): a controlling radio network controller of a cell 1 is a radio network controller 1, and a controlling radio network controller of a cell 2 is a radio network controller 2. An IUR interface exists between the radio network controller 1 and the radio network controller 2. A terminal 1 uses the high speed downlink packet access technology to transmit and receive the service data in the cell 1. The terminal 1 moves from the cell 1 to the cell 2, the radio network controller 1 is a serving radio network controller of the terminal 1, and the radio network controller 2 is a drift radio network controller of the terminal 1. The terminal 1 moves from the cell 1 to the cell 2, the cell 1 and the cell 2 are co-channel cells, the cell 1 is a current serving HS-DSCH cell of the terminal 1, and the cell 2 is a target serving HS-DSCH cell to which the terminal 1 will hand over from the current serving HS-DSCH cell, that is, the terminal 1 wants to perform a serving HS-DSCH cell handover, i.e. the terminal 1 wants to hand over from the serving HS-DSCH cell, namely the cell 1, to the cell 2.

Figure 3:
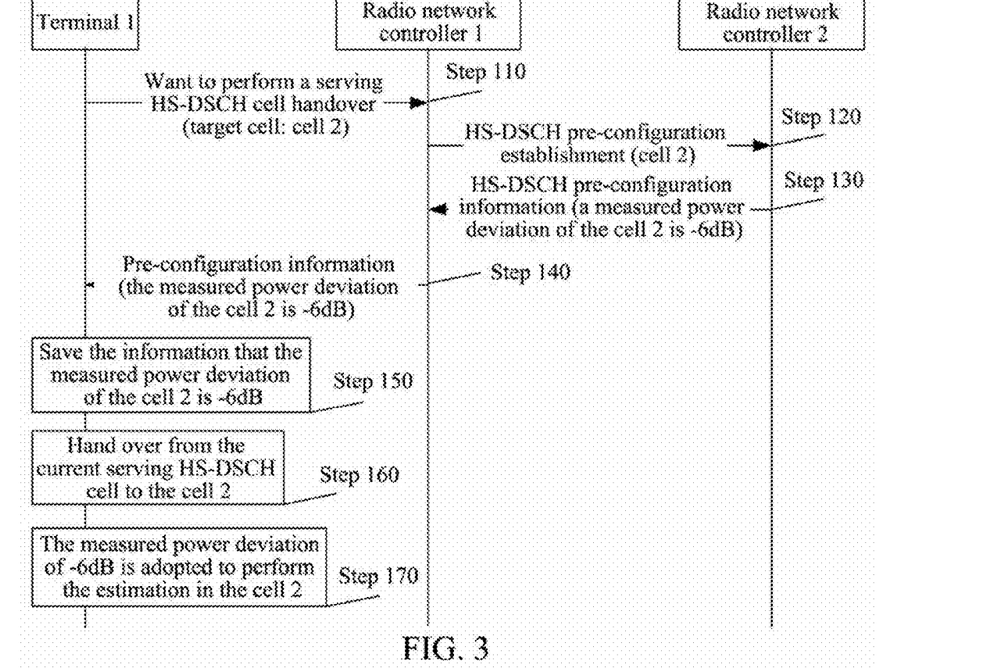
FIG. 3 is a schematic diagram of processing process according to the example 1 of the patent document (a single-carrier scenario).

A processing process of the single-carrier setting scenario in the example is as shown in FIG. 3, and each step is described as follows.

In step 110, a terminal 1 informs a radio network controller 1 that it wants to perform a serving HS-DSCH cell handover, and a target serving HS-DSCH cell is a cell 2.

In step 120, if the radio network controller 1 judges that a controlling radio network controller of the cell 2 is a radio network controller 2, the radio network controller 1 requests the radio network controller 2 to establish an HS-DSCH pre-configuration for the terminal 1 in the target cell namely the cell 2 dominated by the radio network controller 2.

In step 130, the radio network controller 2 returns information of a measured power deviation of the cell 2 which serves as HS-DSCH pre-configuration information to the radio network controller 1.

In the example, the measured power deviation of the cell 2 is −6 dB.

In step 140, the radio network controller 1 takes the information of the measured power deviation of the target serving HS-DSCH cell (cell 2) as pre-configuration information to send to the terminal.

In step 150, the terminal saves the information that the measured power deviation of the target serving HS-DSCH cell (cell 2) is −6 dB.

The above description is for the flow of the serving HS-DSCH cell handover at an access network side, and the following description is for the flow of the serving HS-DSCH cell handover at a terminal side.

In step 160, the terminal hands over from the current serving HS-DSCH cell to the target serving HS-DSCH cell (cell 2).

In step 170, the terminal uses the saved information that the measured power deviation of the target serving HS-DSCH cell (cell 2) is −6 dB to estimate total received power of the high speed physical downlink shared channel in the cell 2, that is, the total received power is estimated according to a measured power deviation of a target serving cell.

EXAMPLE 2

Figure 4:
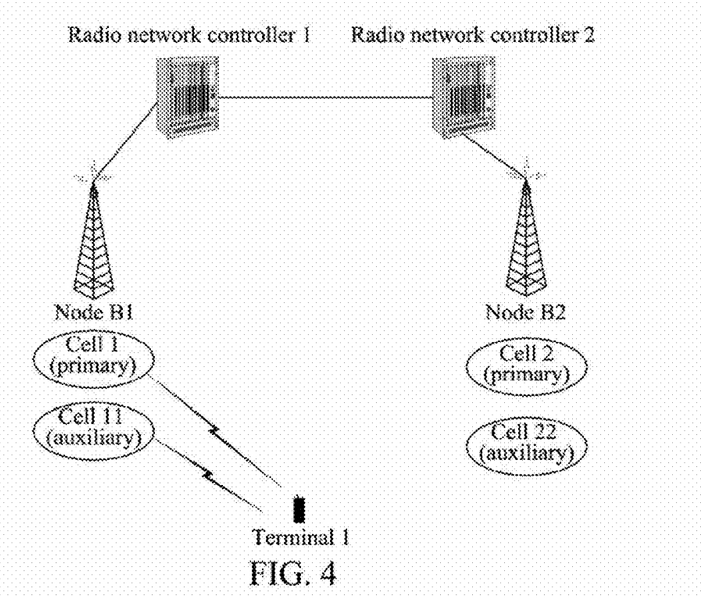
FIG. 4 is a schematic diagram of a multi-carrier scenario according to the example 2 of the patent document.

A multi-carrier setting scenario of the example is as shown in FIG. 4. Since one cell has one and only one carrier, when using the multi-carrier high speed packet access technology, at least two cells must be required, wherein a carrier of one cell serves as a primary carrier, and a carrier of the other cell serves as an auxiliary carrier. Such two cells are called as Dual-cell. The multi-carrier setting scenario is a scenario as shown in FIG. 4, wherein a controlling radio network controller for a cell 1 and a cell 11 is a radio network controller 1, and a controlling radio network controller for a cell 2 and a cell 22 is a radio network controller 2. An IUR interface exists between the radio network controller 1 and the radio network controller 2. The cell 1 and the cell 2 are co-channel cells, and the cell 11 and the cell 22 are co-channel cells. The cell 1 and the cell 11 constitute a dual-cell. The cell 2 and the cell 22 constitute a dual-cell. The terminal 1 uses the high speed downlink packet access technology to transmit and receive the service data in the cell 1 and the cell 11. The terminal 1 moves from a coverage area of the cell 1 and a cell 11 to a coverage area of the cell 2 and a cell 22, the radio network controller 1 is a serving radio network controller of the terminal 1, and the radio network controller 2 is a drift radio network controller of the terminal 1. The terminal 1 moves from the coverage area of the cell 1 and a cell 11 to the coverage area of the cell 2 and a cell 22, the cell 1 and a cell 11 are current serving HS-DSCH cells of the terminal 1, wherein: the cell 1 is a current primary carrier serving HS-DSCH cell, and the cell 11 is a current auxiliary carrier serving HS-DSCH cell; the cell 2 and the cell 22 are target serving HS-DSCH cells to which the terminal 1 will hand over from the current serving HS-DSCH cells, wherein: the cell 2 is a target primary carrier serving HS-DSCH cell, and the cell 22 is a target auxiliary carrier serving HS-DSCH cell. That is, the terminal 1 wants to perform a serving HS-DSCH cell handover, i.e. the terminal 1 wants to hand over from the current primary carrier serving HS-DSCH cell, namely the cell 1, to the cell 2, and hand over from the current auxiliary carrier serving HS-DSCH cell, namely the cell 11, to the cell 22.

Figure 5:
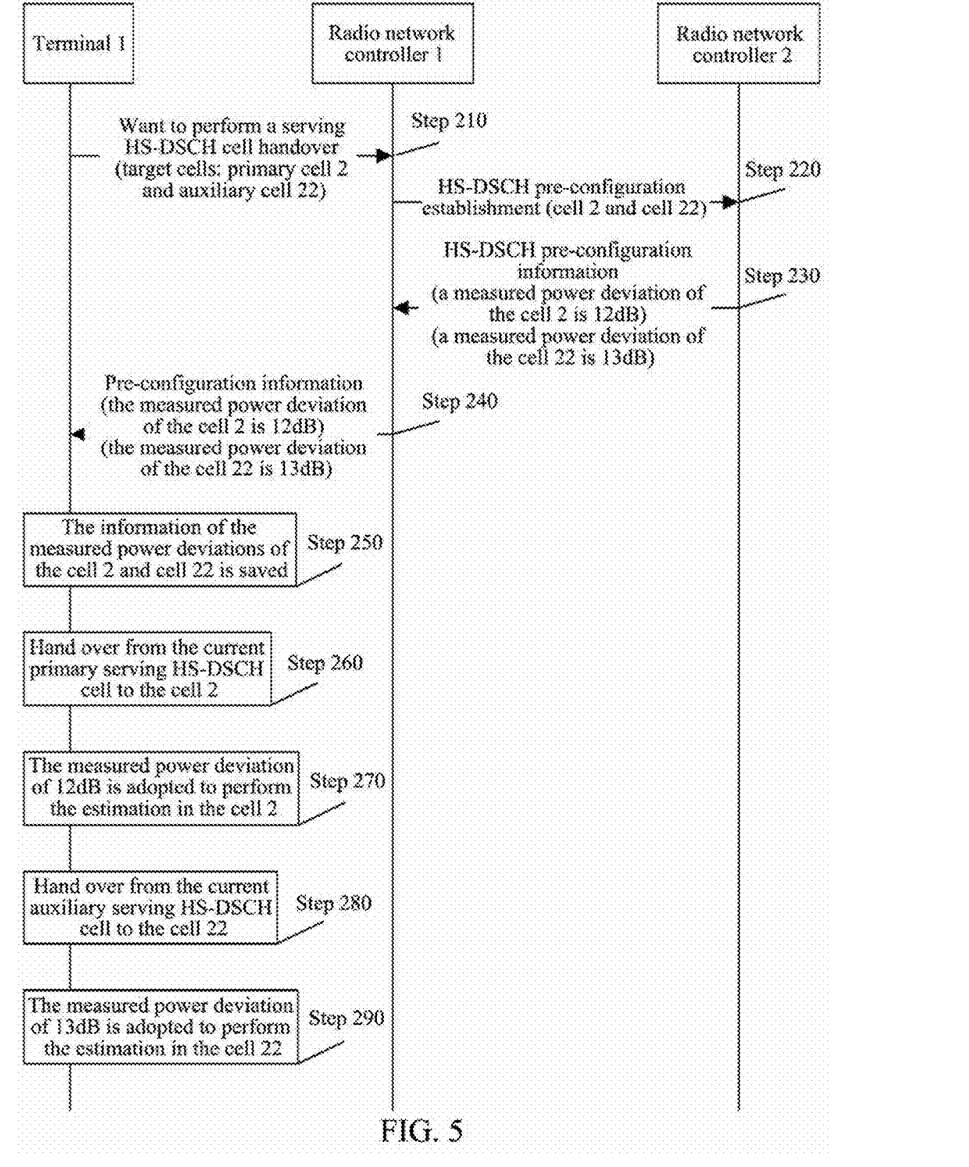
FIG. 5 is a schematic diagram of processing process according to the example 2 of the patent document (a multi-carrier scenario).

A processing process of the multi-carrier setting scenario in the example is as shown in FIG. 5, and each step is described as follows.

In step 210, a terminal 1 informs a radio network controller 1 that it wants to perform a serving HS-DSCH cell handover, a target primary carrier serving HS-DSCH cell is a cell 2, and a target auxiliary carrier serving HS-DSCH cell is a cell 22.

In step 220, if the radio network controller 1 judges that a controlling radio network controller of the cell 2 and the cell 22 is a radio network controller 2, the radio network controller 1 requests the radio network controller 2 to establish an HS-DSCH pre-configuration for the terminal 1 in the target cells, namely the cell 2 and the cell 22, belonging to the radio network controller 2.

In step 230, the radio network controller 2 returns information of measured power deviations of the cell 2 and the cell 22 which serves as HS-DSCH pre-configuration information to the radio network controller 1.

In the example, the measured power deviation of the cell 2 is 12 dB, and the measured power deviation of the cell 22 is 13 dB.

In step 240, the radio network controller 1 takes the information of the measured power deviations of the target serving HS-DSCH cells (including the target primary carrier serving HS-DSCH cell and the target auxiliary carrier serving HS-DSCH cell, that is, including the cell 2 and the cell 22) as pre-configuration information to send to the terminal.

In step 250, the terminal saves the information that the measured power deviation of the target primary carrier serving HS-DSCH cell (cell 2) is 12 dB. The terminal saves the information that the measured power deviation of the target auxiliary carrier serving HS-DSCH cell (cell 22) is 13 dB.

The above description is for the flow of the serving HS-DSCH cell handover at an access network side, and the following description is for the flow of the serving HS-DSCH cell handover at a terminal side.

In step 260, the terminal hands over from the current primary carrier serving HS-DSCH cell to the target primary carrier serving HS-DSCH cell (cell 2).

In step 270, the terminal uses the saved information that the measured power deviation of the target primary carrier serving HS-DSCH cell (cell 2) is 12 dB to estimate total received power of the high speed physical downlink shared channel in the cell 2.

In step 280, the terminal hands over from the current auxiliary carrier serving HS-DSCH cell to the target auxiliary carrier serving HS-DSCH cell (cell 22).

In step 290, the terminal uses the saved information that the measured power deviation of the target auxiliary carrier serving HS-DSCH cell (cell 22) is 13 dB to estimate total received power of the high speed physical downlink shared channel in the cell 22.

EXAMPLE 3

A system for implementing the above method described in the patent document includes a serving radio network controller and a drift radio network controller, wherein the serving radio network controller includes a first module and a second module, wherein:

the first module of the serving radio network controller is configured to: when a terminal performs a serving HS-DSCH cell handover across an IUR interface, request the drift radio network controller to establish an HS-DSCH pre-configuration in a target serving HS-DSCH cell dominated by the drift radio network controller;

the drift radio network controller is configured to return information of a measured power deviation of the target serving HS-DSCH cell which serves as HS-DSCH pre-configuration information to the serving radio network controller; and the second module of the serving radio network controller is configured to take the information of the measured power deviation of the target serving HS-DSCH cell as pre-configuration information to send to the terminal.

The above system mainly describes the configurations at the access network side. Besides, the system also can include the terminal, and the terminal is configured to: after handing over from a current serving HS-DSCH cell to the target serving HS-DSCH cell, use the measured power deviation of the target serving HS-DSCH cell to estimate the total received power of the high speed physical downlink shared channel in the target serving HS-DSCH cell.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module in the above examples can be implemented in a form of hardware, and also can be implemented in a form of software function module. The patent document is not limited to any combination of hardware and software in a specific form.

Certainly, the patent document can still have other various examples, the skilled familiar with the art can make various corresponding changes and variations according to the patent document without departing from the spirit and essence of the patent document, and these corresponding changes and variations shall all belong to the protection scope of the appended claims of the patent document.

INDUSTRIAL APPLICABILITY

Compared with the related art, in the patent document, when performing a serving HS-DSCH cell handover across an IUR interface, it enables the terminal to correctly estimate the total received power of the high speed physical downlink shared channel so as to obtain a correct channel quality indication value, thus guarantying an appropriate use of the high speed downlink packet access technology and ensuring the performance.

What is claimed is:

1. A method for calculating total received power of a high speed physical downlink shared channel, comprising:
   when a terminal performs a serving High Speed Downlink Shared Channel (HS-DSCH) cell handover across an Interconnection of Radio Network Controller (IUR) interface, a serving radio network controller requesting a drift radio network controller to establish an HS-DSCH pre-configuration in a target serving HS-DSCH cell dominated by the drift radio network controller;
   the drift radio network controller returning information of a measured power deviation of the target serving HS-DSCH cell which serves as HS-DSCH pre-configuration information to the serving radio network controller;
   the serving radio network controller taking the information of the measured power deviation of the target serving HS-DSCH cell as pre-configuration information to send to the terminal;
   after the terminal hands over from a current serving HS-DSCH cell to the target serving HS-DSCH cell, the terminal using the measured power deviation of the target serving HS-DSCH cell to estimate the total received power of the high speed physical downlink shared channel in the target serving HS-DSCH cell;
   wherein,
   the method is applied to a multi-carrier environment; the target serving HS-DSCH cell comprises: a primary carrier target serving HS-DSCH cell and an auxiliary carrier target serving HS-DSCH cell.

2. The method according to claim 1, wherein,
   the method is applied to a single-carrier environment; the target serving HS-DSCH cell comprises: a single-carrier target serving HS-DSCH cell.

3. An access network system, comprising: a serving radio network controller, a drift radio network controller and a terminal, wherein:
   the serving radio network controller is configured to: when the terminal performs a serving High Speed Downlink Shared Channel (HS-DSCH) cell handover across an Interconnection of Radio Network Controller (IUR) interface, request the drift radio network controller to establish an HS-DSCH pre-configuration in a target serving HS-DSCH cell dominated by the drift radio network controller;
   the drift radio network controller is configured to return information of a measured power deviation of the target serving HS-DSCH cell which serves as HS-DSCH pre-configuration information to the serving radio network controller; and
   the serving radio network controller is further configured to take the information of the measured power deviation of the target serving HS-DSCH cell as pre-configuration information to send to the terminal;
   after the terminal hands over from a current serving HS-DSCH cell to the target serving HS-DSCH cell, the terminal using the measured power deviation of the target serving HS-DSCH cell to estimate the total received power of the high speed physical downlink shared channel in the target serving HS-DSCH cell;
   wherein,
   the system is applied to a multi-carrier environment; the target serving HS-DSCH cell comprises: a primary carrier target serving HS-DSCH cell and an auxiliary carrier target serving HS-DSCH cell.

4. The system according to claim 3, wherein,
   the system is applied to a single-carrier environment; the target serving HS-DSCH cell comprises: a single-carrier target serving HS-DSCH cell.

5. A method for calculating total received power of a high speed physical downlink shared channel, comprising:
   when a terminal performs a serving High Speed Downlink Shared Channel (HS-DSCH) cell handover across an Interconnection of Radio Network Controller (IUR) interface, the terminal requesting a drift radio network controller through a serving radio network controller to establish an HS-DSCH pre-configuration in a target serving HS-DSCH cell dominated by the drift radio network controller;
   the terminal receiving from the drift radio network controller through the serving radio network controller information of a measured power deviation of the target serving HS-DSCH cell which serves as HS-DSCH pre-configuration information;
   after the terminal hands over from a current serving HS-DSCH cell to the target serving HS-DSCH cell, the terminal using the measured power deviation of the target serving HS-DSCH cell to estimate the total received power of the high speed physical downlink shared channel in the target serving HS-DSCH cell;
   wherein,
   the method is applied to a multi-carrier environment; the target serving HS-DSCH cell comprises: a primary carrier target serving HS-DSCH cell and an auxiliary carrier target serving HS-DSCH cell.

6. The method according to claim 5, wherein,
the method is applied to a single-carrier environment; the target serving HS-DSCH cell comprises: a single-carrier target serving HS-DSCH cell.

7. The system according to claim 3, further comprising;
when performing a serving High Speed Downlink Shared Channel (HS-DSCH) cell handover across an Interconnection of Radio Network Controller (IUR) interface, the terminal request a drift radio network controller through a serving radio network controller to establish an HS-DSCH pre-configuration in a target serving HS-DSCH cell dominated by the drift radio network controller.

* * * * *